United States Patent

Tolar

[15] 3,640,538

[45] Feb. 8, 1972

[54] UNIVERSAL TAPE RECORDER AND PLAYBACK INSTRUMENT

[72] Inventor: James H. Tolar, Mayfield Hgts., Ohio

[73] Assignee: Tenna Corporation

[22] Filed: June 29, 1966

[21] Appl. No.: 561,635

[52] U.S. Cl. ................274/4 G, 179/100.2 Z, 179/100.2 CA, 226/90, 242/55.19 A

[51] Int. Cl. .....................................G11b 15/00, G11b 21/12

[58] Field of Search ...............274/4, 11; 242/55.13, 55.19 A; 226/181; 179/100.2 Z, 100.2 MJ, 100.2 CA

[56] References Cited

UNITED STATES PATENTS

| | | | |
|---|---|---|---|
| 2,778,880 | 1/1957 | Eash | 179/100.2 Z |
| 2,876,005 | 3/1959 | Eash | 179/100.2 Z |
| 3,023,943 | 3/1962 | Schober | 242/55.19 A X |
| 3,027,112 | 3/1962 | Flan | 242/55.19 A X |
| 3,096,920 | 7/1963 | Schober | 242/55.19 A X |
| 3,145,944 | 8/1964 | Pendleton | 242/68.1 |
| 3,199,093 | 8/1965 | Cheney | 179/100.2 Z X |
| 3,259,712 | 7/1966 | Heinisch | 179/100.2 Z |
| 3,301,564 | 1/1967 | Platt | 274/11 |

*Primary Examiner*—Leonard Forman
*Assistant Examiner*—Dennis A. Dearing
*Attorney*—Baldwin, Egan, Walling, Fetzer

[57] ABSTRACT

A tape recorder and playback instrument adapted to operate with different types of tape-carrying cartridges. The instrument includes a guideway for receiving different cartridges and is provided with a sensing member which detects the type of cartridge inserted into the guideway. With one class of cartridges, means responsive to the sensing member are employed for pivoting a toggle-mounted pinch roller into position to press the tape within the cartridge against a rotating drive capstan. When a second class of cartridge is inserted, means are employed for preventing the movement of the pinch roller. In addition, a positioning mechanism responsive to the sensing member locates the transducer adjacent the desired track on the magnetic tape.

9 Claims, 22 Drawing Figures

INVENTOR
JAMES H. TOLAR

BY [signature]
ATTORNEY

INVENTOR
JAMES H. TOLAR
BY [signature]
ATTORNEY

PATENTED FEB 8 1972

3,640,538

SHEET 3 OF 3

INVENTOR
JAMES H. TOLAR

BY [signature]
ATTORNEY

UNIVERSAL TAPE RECORDER AND PLAYBACK INSTRUMENT

This invention relates to magnetic tape recorder and playback instruments, and more particularly to players for universally playing back magnetic tape which may be loaded into different types of continuous loop cartridges.

Commercially available magnetic tape comes in several different types of cartridges. Heretofore, each company which manufactures or prerecords such tape has tended to load it into cartridges of its own design. As a result, one form of the presently available cartridges contains a presser foot or roller for pushing the tape against a revolving capstan which is then able to pull the tape across a transducer head. Another form of cartridge requires the use of an externally mounted roller or pinch wheel which is introduced through a cutout or opening in the bottom of the cartridge to press the tape against a revolving capstan. In addition, the different cartridges may be adapted to use any of several different track arrangements. Thus, for example, the tape may have any suitable number of tracks, such as one, two, four, eight, . . . etc. tracks.

At present, two systems are popular, one with four tracks and the other with eight tracks. Since each of these systems requires a particular type of player to accommodate it, each is thereby incompatible with the other. Hence, the user has had to restrict his enjoyment of his tape recordings to the specific cartridges offered for his particular machine. Conversely stated, he had been denied an opportunity to hear recordings loaded in cartridges for other machines.

Heretofore, troubles have been encountered when a single machine was designed to play back all of these and other cartridges. To mention one such trouble, by way of example, the roller was designed to press upwardly against the bottom of a cartridge, thus flipping into a playing position when the cutout or opening was present and pushing against the cartridge when there was not cutout or opening. The trouble was that pressure on the bottom of a cartridge with no cutout or opening tended to make a flat spot on the roller. This, in turn, caused an uneven tape feed. Those familiar with these tape recorders will readily perceive other problems and troubles.

Another problem relates to the environment in which the tape players are used. For example, the players are sometimes built into automobiles where a driver should keep both hands on the steering wheel while in motion. In the present four track player, the unit must be operated manually to move the pinch roller and also to position the pickup head. This creates a driving hazard, which the present invention helps to eliminate.

Accordingly, an object of this invention is to provide a fully automatic machine that will play either four track or eight track cartridges. A more particular object is to provide tape players for universally playing back a great variety of the presently available cartridges. In this connection, an object is to provide a tape player for playing back a cartridge having either an internal presser foot or idler roller for pressing the tape against a revolving capstan, or a cartridge requiring the introduction of an external pressure roller for this purpose.

A further object is to provide a tape player for universally playing back tape recordings having one two, four, eight, or more tracks. Here, an object is to provide positioning mechanism for locating the transducer adjacent any desired one or more of many tracks which may be selected at will by the user.

Yet another object of the invention is to provide low-cost universal tape players especially well suited for mass production on general purpose machine tools. Here, an object is to produce simple and extremely reliable, trouble free tape players, universally usable with virtually any commercially available cartridges.

In accordance with one aspect of the invention, these and other objects of the invention are accomplished by means of a tape player having a guideway thereon for receiving a magnetic tape cartridge. Sensing means are positioned in the guideway for detecting the type of cartridge which is in a playing position according to a distinguishing physical characteristic of such cartridge. When one type of cartridge is detected, a toggle mounted roller or pinch wheel is flipped up into a playback position, and the tape player is adapted to operate in one manner. When another type of cartridge is detected, the roller or pinch wheel remains in a retracted position, and the tape player is adapted to operate in another manner. This way, the roller may remain in a completely free position when it is not in use and thereby avoid the formation of flat spots on its circumference which otherwise would impair its function.

The nature of a preferred embodiment of the universal tape player for accomplishing these and other objects, will become more apparent from a study of the attached drawings in which.

Figures 1, 2, 3, 13, 14, 15:
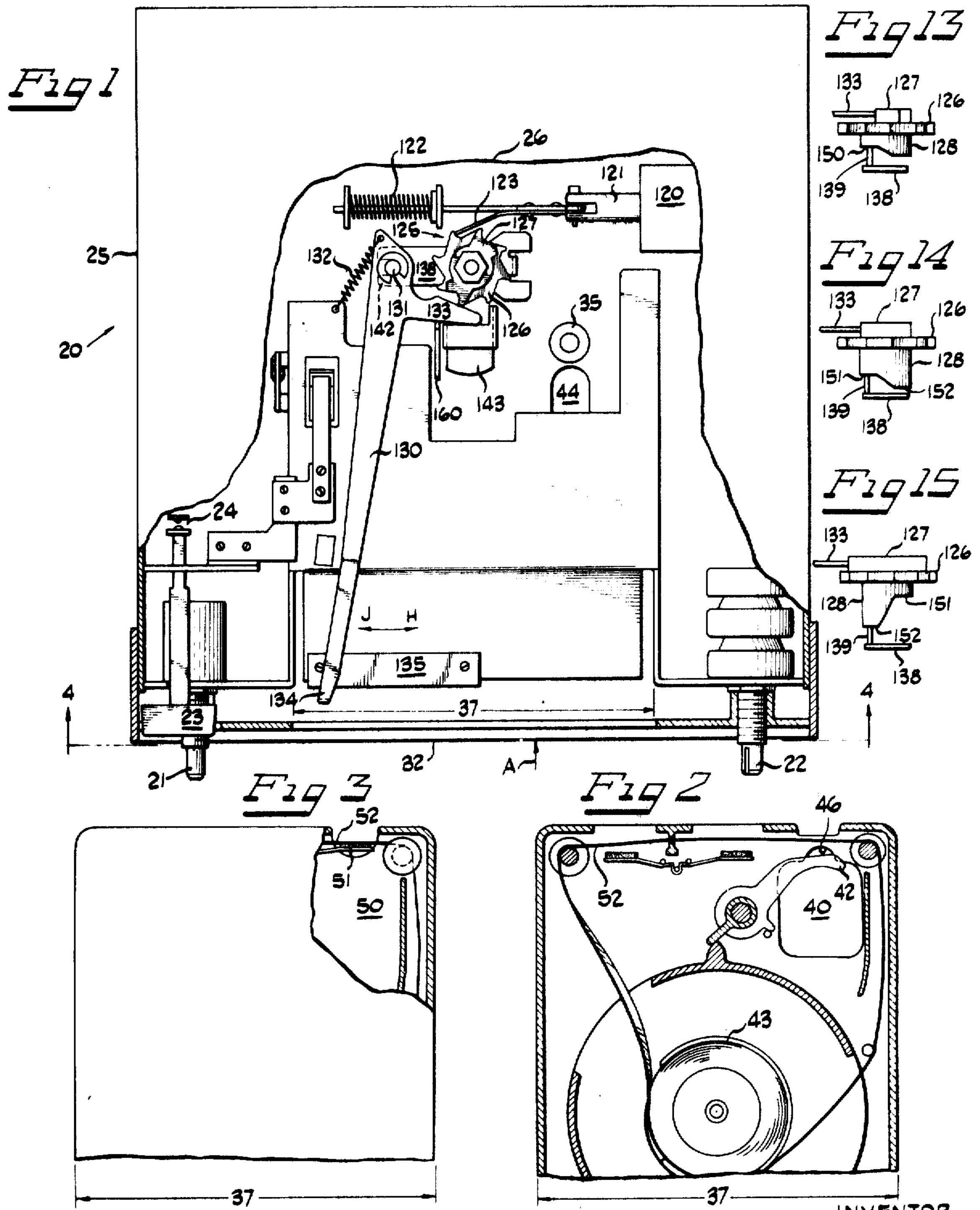
FIG. 1 is a top plan view looking down on a universal tape player.
FIG. 2 is a top plan view of a first type of tape cartridge adapted to use an idler roller or a pinch wheel drive arrangement.
FIG. 3 is a top plan view of a second type of tape cartridge adapted to use a presser foot drive arrangement.
FIGS. 13–15 are three stop motion views showing how an index wheel is operated to control the positioning mechanism of FIG. 12.

These drawings and the following specification show and describe a preferred embodiment of the invention. However, the invention is not to be construed as limited to this particular embodiment. Quite the contrary, the invention is to be construed broadly to include all equivalents falling within the true spirit of the invention.

The universal tape player 20 (FIG. 1) has the usual "off", "on", volume, tone control and other desired control devices 21, 22. In addition, it includes a track selector pushbutton 23 which controls contacts 24 for adjusting the position of a transducer head relative to the magnetic tape. These controls are located on the front of a housing 25 used for enclosing and protecting the tape player mechanism.

Figure 4:
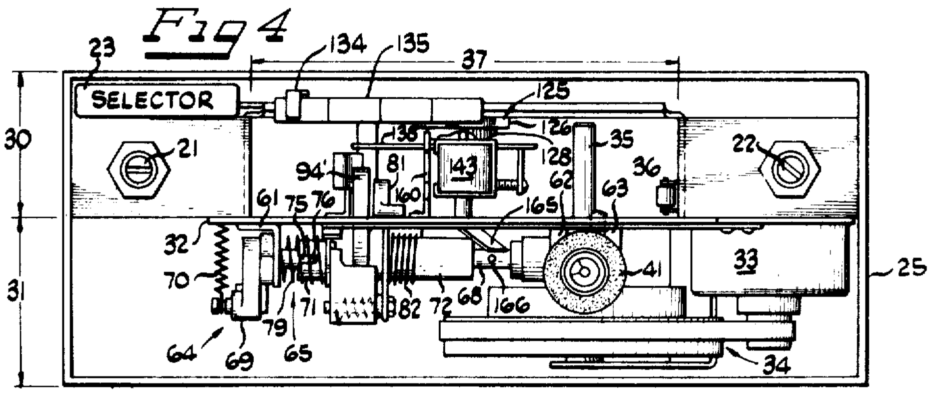
FIG. 4 is a front elevation view of the universal tape player, taken along line 4—4 of FIG. 1.

The housing 25 is shown as partially broken away at 26 to reveal those of the inner parts which are important, insofar as the invention is concerned. The housing is also shown in FIG. 4 with its front escutcheon removed to reveal these and other parts. This housing may be conveniently made in the form of a sleeve which slips over the tape player.

Inside the housing, the tape player is horizontally divided into upper and lower parts 30, 31 by a base plate 32. In general, the cartridge and controls occupy the space 30 above the plate 32. The motor 33, drive 34, and other machinery or operating parts are in the space 31 below the plate. The drive 34 includes a belt trained over a pulley wheel mounted on an axle which turns a capstan 35. The capstan pulls the tape through the tape cartridge.

When pushed through a rectangular opening in the front of the housing, a cartridge fits into a guideway having a height 36 and width 37. The arrow A (FIGS. 6–9) indicates the direction in which the cartridge moves when it is pushed.

FIG. 2 shows a cartridge adapted to use an idler roller for pushing the tape against a running capstan. In greater detail, the floor of the cartridge of FIG. 2 includes a cutout or opening 40. In its normal or nonoperating position, the toggle-mounted idler pinch roller 41 is positioned outside the cartridge and located adjacent the space where the cutout or opening will be when the cartridge is put into the tape player. As the cartridge is pushed into its playing position, the pinch roller flips up into the opening 40 where it assumes the operating position and presses the tape against the capstan 35. In doing so, it releases brake 42 to allow the spool 43 to unwind the tape. A slot 44 (FIG. 1) in the baseplate 32 provides a clearance for the shaft carrying the pinch roller.

When the cartridge of FIG. 2 is pulled out of the guideway, the front edge 46 of the opening 40 works against a cam surface 47 (FIG. 9) below the pinch roller to exert a force which flops the pinch roller downwardly into its normal or nonoperating position below baseplate 32. The brake arm 42 is released, and the tape spool 43 is restrained against further movement.

Figure 3A:
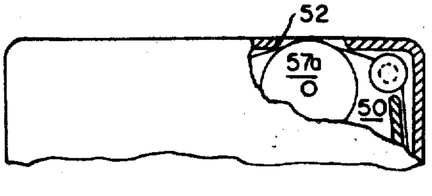
FIG. 3A is a top plan view of the second type of tape cartridge adapted to use a self-contained pressure wheel.

The cartridge of FIG. 3 has the same general dimensions as those of the FIG. 2 cartridge. However, the FIG. 3 cartridge has a solid and unbroken floor at the location 50 which corresponds to the location where the cutout or opening 40 appears in FIG. 2. The cartridge of FIG. 3 does not require and cannot use a pinch roller, such as 41. Instead, it contains a spring-biased, felt pad 51 which pushes the tape 52 against the capstan 35 when the cartridge is in a playing position in the guideway. Pinch roller 41 must remain in a nonoperating position below the floor 50 of the cartridge of FIG. 3. Moreover, the pinch roller 41 should be suspended freely so that is will not push against anything which might tend to flatten the wheel. A similar cartridge (FIG. 3A) employs a built-in roller 51*a* instead of the felt pressure pad, and places the same requirements of operation on the player mechanism as does the cartridge of FIG. 3.

Figure 5:
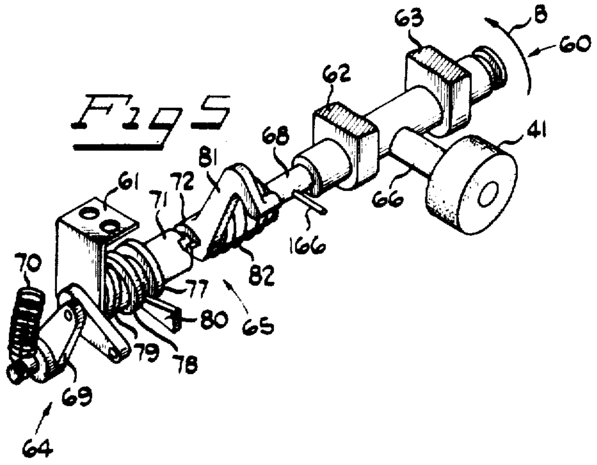
FIG. 5 is a perspective view of a shaft, clutch and actuation control subassembly for providing a toggle action idler roller.

The toggle mounting shown in FIG. 5 is used to flip the pinch roller 41 from the nonoperating to the operating positions. More particularly, this mounting includes a rotatable shaft assembly 60 mounted in journal bearings on a bracket 61 and a pair of pillow blocks 62, 63. The toggle action results from an over center spring device 64. When engaged, a dog clutch 65 selectively allows the pinch roller to flip up to its operating position. When disengaged, the clutch precludes such action, and the roller remains in its nonoperating position.

In greater detail, the pinch roller 41 may be a rubber wheel rotatably mounted on the end of an operating arm 66 which extends perpendicularly from the shaft assembly. The arm 66 and shaft 60 turn as a unit. The shaft 60 includes a section 68 of reduced diameter which rigidly interconnects the larger roller mounting section and the toggle spring device 64. The toggle device 64 includes a bellcrank arm 69 having a spring 70 attached thereto for providing a snap action.

FIG. 5 shows the pinch roller 41 resting in its nonoperating position. If shaft 60 rotates in the direction B, bellcrank arm 69 stretches spring 70 over center whereupon it contracts to flip pinch roller 41 upwardly into its operating position. If a force counter to arrow B is thereafter applied to the arm 66, bellcrank arm 69 again stretches spring 70 until it passes over center. Then, spring 70 contracts to flop the pinch roller 41 back to its nonoperating position as shown in FIG. 5.

The clutch device 65 is here shown as having two-concentrically mounted, axially aligned sleeve members 71, 72 loosely fitting on the shaft 60. The adjacent faces of these members include the well-known complementary contours of a dog clutch arrangement. One-half of the clutch (the sleeve member 71) has a guideway 75 (FIG. 9A) formed therein to cooperate with a pin 76 running through shaft 68. Thus, the clutch member 71 may freely slide longitudinally along the axial length of the rod 68. However, the clutch member 71 and rod 68 must turn as a unit.

An actuator control device selectively operates the clutch. More particularly, the clutch sleeve member 71 is shaped to have two collars 77, 78 for limiting longitudinal motion. A spring 79 is compressed between the bracket 61 and the collar 78 for urging the clutch member 71 toward the clutch member 72. However, a tab 80 may be interposed between the collars 77, 78 to interfere and prevent the member 71 from sliding in response to the urging of the spring 79. Thus, the tab 80 and its associated parts are an actuator control device for allowing the clutch to engage or disengage.

The other half of the clutch (sleeve member 72) includes an integral-operating arm 81 which is positioned in the guideway that receives the cartridge. As the cartridge is pushed into its playing position, the arm 81 rotates the clutch member 72 and winds up a yield spring 82. If the cartridge is removed from the guideway, the spring 82 unwinds and forces the operating arm 81 back to its rest position.

Figure 8:
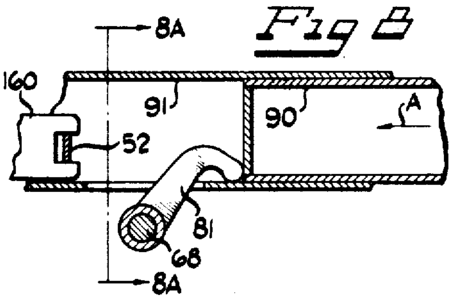
Figure 8A:
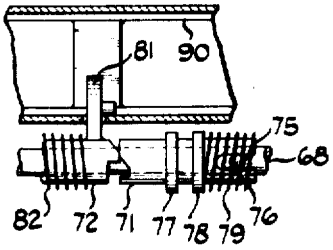

The clutch operates this way. If the retaining tab 80 is resting between the collars 77, 78 when the cartridge pushes against arm 81, the two sleeve members 71, 72 of the dog clutch 65 are held apart. Member 72 rotates without any effect on the member 71. On the other hand, if the tab 80 is not resting between the collars 77. 78 spring 79 forces the two clutch members 71, 72 together. A pair of perpendicular faces 85 (FIG. 9A) come together, and the member 71, 72 must turn as a unit. Since member 71 is keyed to the rod 68, the toggle action will occur, and the pinch roller flips into its operate position. When the cartridge is removed and the spring 82 unwinds, the two cam faces 86 work against each other. The clutch members 71, 72 are forced apart, as best seen in FIG. 8A. Then, the tab 80 can drop back into position between the collars 77, 78. The clutch has now returned to normal and is ready for the next operation.

In keeping with an aspect of the invention, a sensing finger explores the floor of each cartridge as it slides through the guideway. If a cutout or opening is present, the sensing finger removes the restraining tab to allow the clutch to engage and flip the pinch roller into its operating position. On the other hand, if the cutout or opening is not present, the sensing finger prevents the removal of the restraining tab. The clutch does not engage, and the pinch roller remains in its nonoperating position.

The operation of this clutching arrangement will become more apparent from a study of the stop motion views in FIGS. 6–9. A tape cartridge 90 is slid through the guideway 91 in the direction of the arrow A. At this time, the tab 80 rests between the collars 77 and 78. A sensing finger 92 detects the presence or absence of the cutout or opening 40. If such a cutout or opening is present, a flat spring 93 remains in a rest position, as shown by solid lines in FIG. 6. If the cutout or opening is not present, the flat spring is deflected downwardly to an operated position shown by dashed lines 94.

The clutch actuator control mechanism includes an arm 94′, a clutch release part 95, and a yield spring 96 supported by a bracket 97. The actuator arm 94′ projects into the guideway 91 in a position where it will engage the cartridge 90 as it slides in the direction A. Continued cartridge motion swings the arm 94′ in the direction of the arrow C. As it swings, the arm 94′ winds up the yield spring 96 and causes the release part 95 to rotate.

Figure 7:
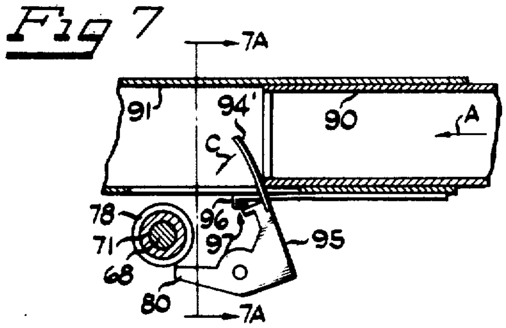
Figure 7A:
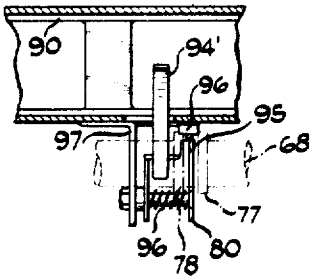

If the sensing finger 92 detects the cutout or opening 40, the flat spring 93 remains in the normal position. The upper end of release part 95 passes the catch 96 with no effect, as shown at 97 (FIG. 7). The restraining tab 80 on part 95 moves out of the restraining position between collars 77, 78. Thereupon, the clutch member 71 moves toward and engages the clutch member 72.

Figure 6:
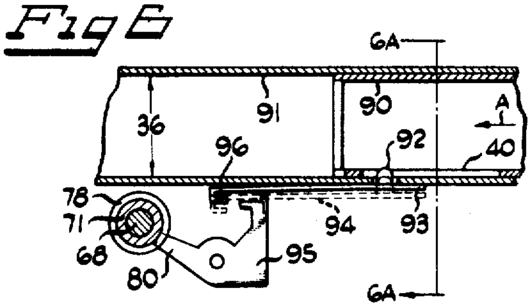
FIGS. 6–9 are three stop motion views—each having two views taken at right angles with respect to each other—for illustrating the selective clutch action of the subassembly of FIG. 5.
Figure 6A:
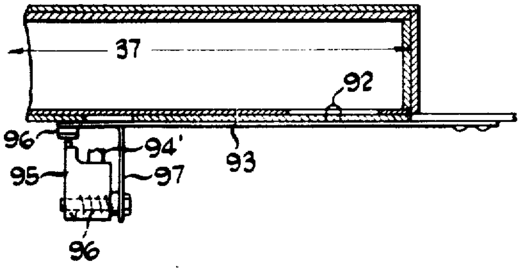

If the sensing finger 92 does not detect the cutout or opening, the flat spring moves to its off-normal position as shown by dotted lines 94 in FIG. 6. The ends of part 95 and flat spring 93 do not pass each other as shown at 97. Instead, the flat spring end 96 catches the upper end of the release part 95 and holds it so that it cannot move further. The restraining tab 80 remains between the collars 77, 78. Clutch member 71 cannot approach the clutch member 72. As the arm 94' continues to be driven forward by the advancing cartridge, it merely winds up the yield spring 96.

Figure 9:
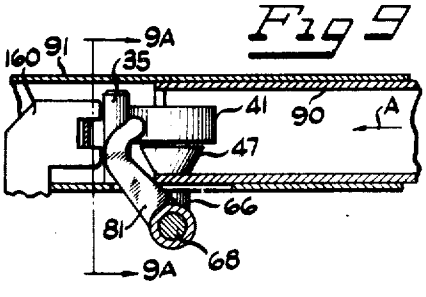
Figure 9A:
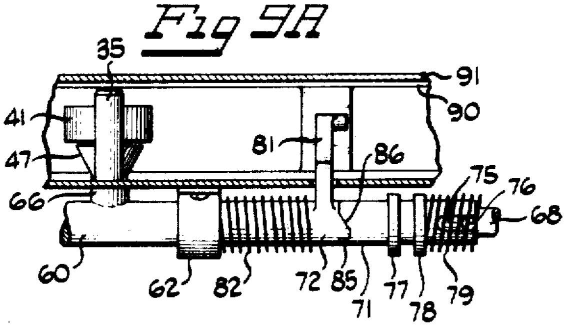

The cartridge 90 continues to slide in guideway 91 until it engages and rotates the operating arm 81. This, in turn, rotates the clutch sleeve 72. If there is no cutout or opening 40 and, therefore, restraining tab 80 is holding the clutch member 71 away from clutch member 72, the two dog clutch faces pass each other with no effect. On the other hand, if there is a cutout and restraining tab 80 moves away so that it is not holding the clutch members apart, the rotation of operating arm 81 is transmitted through the clutch. Turning forces act upon pin 76 to rotate shaft 60 and flip the pinch roller 41 into its operate position (FIG. 9). When in this position, the roller presses the tape against capstan 35. As the motor turns capstan 35, it pulls the tape, and pinch roller 41 acts as an idler wheel.

When the cartridge is removed, the edge 46 of cutout 40 acts on cam surface 47 to flop the pinch roller into its nonoperating position.

An alternative embodiment (FIG. 10) includes a flat spring 100 operated by a sensing finger 101 in essentially the same manner as that shown at 93 and 94 (FIG. 6). The embodiment of FIG. 10 includes a pair of slides 102, 103 which perform substantially the same function that is performed by the parts 94', 95 which are best shown in FIG. 7. That is, these slides move the restraining tab 80*a* away from its normal position between the collars 77, 78 if a cutout or opening is present in the floor of the cartridge. When the cartridge is pushed into the guideway, it engages the arm 104 and pushes the slide 102 in the direction of the arrow D. A yield spring 105 interconnects the two slides 102, 103 in a manner such that slide 103 is also pulled in the direction of the arrow D.

If a cutout or opening 40 appears in the cartridge, the tension of the yield spring 105 causes slide 103 to move with slide 102 and thereby remove the tab 80*a* from between the collars 77, 78. This allows clutch 65 to operate and flip the pinch roller 41. On the other hand, if there is no cutout or opening 40, the sensing finger 101 pushes flat spring 100 upwardly (as viewed in FIG. 10). The end of the spring 100 catches the end 106 on the slide 104 and prevents it from moving further in the direction of arrow D. Tab 80*a* remains between the collars 77, 78 to prevent the operation of clutch 65 and the flipping of the pinch roller 41. Thereafter, the continued motion of the cartridge merely pushes the slide 102 and stretches the yield spring 105, with no operating effect upon the clutch 65.

When the cartridge is removed from the guideway, the slides 102, 103 return to normal responsive to the contraction of the springs 105, 107. The tab 80*a* returns to or remains in its normal position between the collars 77, 78.

Means are provided for raising or lowering the transducer to select any desired track on the magnetic tape. In greater detail, a tape 110 (FIG. 11) may have a single track, and the transducer may have any elevation, as long as it properly engages the tape. However, if the tape 111 has two tracks, the transducer must be raised or lowered to be opposite either track 112 or track 113. By inspection, it should be obvious that the transducer positioning means may select any one of four tracks on tape 114 or any one of eight tracks in tape 115.

Figure 12:
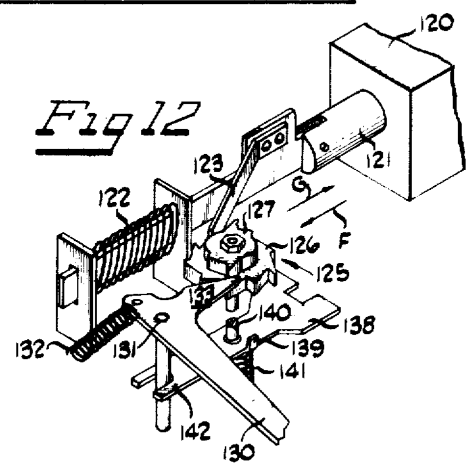
FIG. 12 is a perspective view of a positioning mechanism for raising or lowering a transducer to be adjacent a particular track.

The transducer positioning mechanism is separately shown in FIG. 12 as including a solenoid 120 for operating an index wheel 125 in a rotary, step-by-step manner. As it rotates, a vertical cam on the bottom of the index wheel positions the transducer against the force of spring 141. Another horizontal cam on the top of the wheel moves an indicator to give a visual reading of the transducer position.

More particularly, when energized a solenoid 120 pulls an armature 121 in the direction of the arrow F. When the solenoid is deenergized, spring 122 pushes the armature in the direction of the arrow G. Mounted on and moving with the armature 121 is a pawl 123 which also travels back and forth in the directions F, G.

The index wheel 125 is situated near the pawl to receive and translate the linear motion of the armature 121 into a rotary motion. Preferably, this index wheel is a single piece-part made from a suitable plastic material, such as nylon, for example. It may be described as a ratchet wheel 126 having a horizontally indexing cam 127 on its upper surface and a vertically indexing cam 128 on its lower surface. The upper or horizontally indexing cam causes a readout for indicating the transducer position. The lower or vertically indexing cam controls the elevation of the transducer.

To indicate the position of the transducer, the arm 133 follows the cam 127 to swing the pointer at the end of arm 130. In greater detail, the arm 130 is pivotally mounted at 131 and biased by the spring 132 to swing the pointer 134 in the direction J. The arm 133 rides on the cam 127 with a mechanical advantage which swings the arm 130, against the bias of spring 132, by a distance which indicates the transducer elevation. An associated scale 135 tells the user how far the pointer 134 has swung and, thereby gives indication of the position of the transducer and, consequently, of the particular track or channel selected.

The lower or vertical cam surface 128 on the index wheel 125 controls the elevation of the transducer. In greater detail, an arm 138, having an upstanding tab 139 thereon, is mounted to slide up and down on a shaft 140. A spring 141 normally urges the arm 138 to its uppermost position. The opposite end of the arm 138 has a generally bifurcated shape 142 so that it may slide on shaft 131 to prevent any rotation of the arm 138. The end of the arm 138 is connected to a transducer head 143, as best seen in FIGS. 1 and 4. Thus, the transducer 143 raises or lowers as the arm 138 raises and lowers.

The actual contours of the vertical cam surfaces are best seen in FIG. 4. However, to better illustrate the operation, they have been redrawn in a somewhat exaggerated scale in FIGS. 13–15.

The transducer positioning mechanism operates this way. The index wheel 126 may turn endlessly, a step at a time. Assume first that it is standing in the position shown in FIG. 13. Spring 141 urges arm 138 upwardly until tab 139 touches the lower vertical cam surface 150. The spring 132 pulls arm 130 until the cam follower 133 comes to rest against the upper horizontal cam surface 127. At the end of the arm 130, the pointer 134 swings as far as it can in a particular direction to indicate that the transducer is in its highest position. By way of example, this may be the direction H.

The person using the tape player pushes the selector button 23 and closes the contacts 24. Solenoid 120 is energized to pull armature 121 and push pawl 123 against the ratchet wheel 126. When the selector button is released, contacts 24 open, solenoid 120 is deenergized, and armature 121 returns to normal under the urging of the spring 122.

The index wheel 125 has taken one step to the position shown in FIG. 14. The vertical cam surface 151 comes to rest over the tab 139. The arm 138 moves downward to the next lower step, and the transducer 143 moves to a different tracking position. The horizontal cam 127 pushes follower 133, and the arm 130 swings in a direction (here assumed to be J) so that pointer 134 indicates a different track indicating position on the scale 135.

If the selector pushbutton 23 is pushed again, the solenoid 120 is energized to push the pawl 123 against ratchet wheel 126. The index wheel 125 takes another step. Vertical cam surface 152 comes to rest over the tab 139. The arm 138 moves down to take the transducer to its lowermost position. The horizontal cam surface 127 pushes follower 133 so that the pointer 134 moves to its extreme left-hand position, thus indicating the lowest transducer position.

If selector pushbutton 23 is pushed again, the index wheel takes another step so that the cam surface 151 comes to rest over the tab 139. The arm 138 and transducer return to the most elevated position shown in FIG. 13.

The foregoing description of FIGS. 13–15 covers the manner in which a transducer may be raised or lowered in order to play back a given track on any of a number of different types of magnetic tapes. In addition, it is also necessary to change the position of the tape relative to the transducer head according to the type of cartridge that is used. For example, one particular type of cartridge using the pinch roller requires the tape to pass over the transducer head in a position which is 0.016 inches higher than the corresponding tape-to-transducer position when the pinch roller is not used. Thus, the tape must be raised 0.016 when the pinch roller is flipped up into the operating position inside the cartridge.

Figures 10, 11, 16, 17:
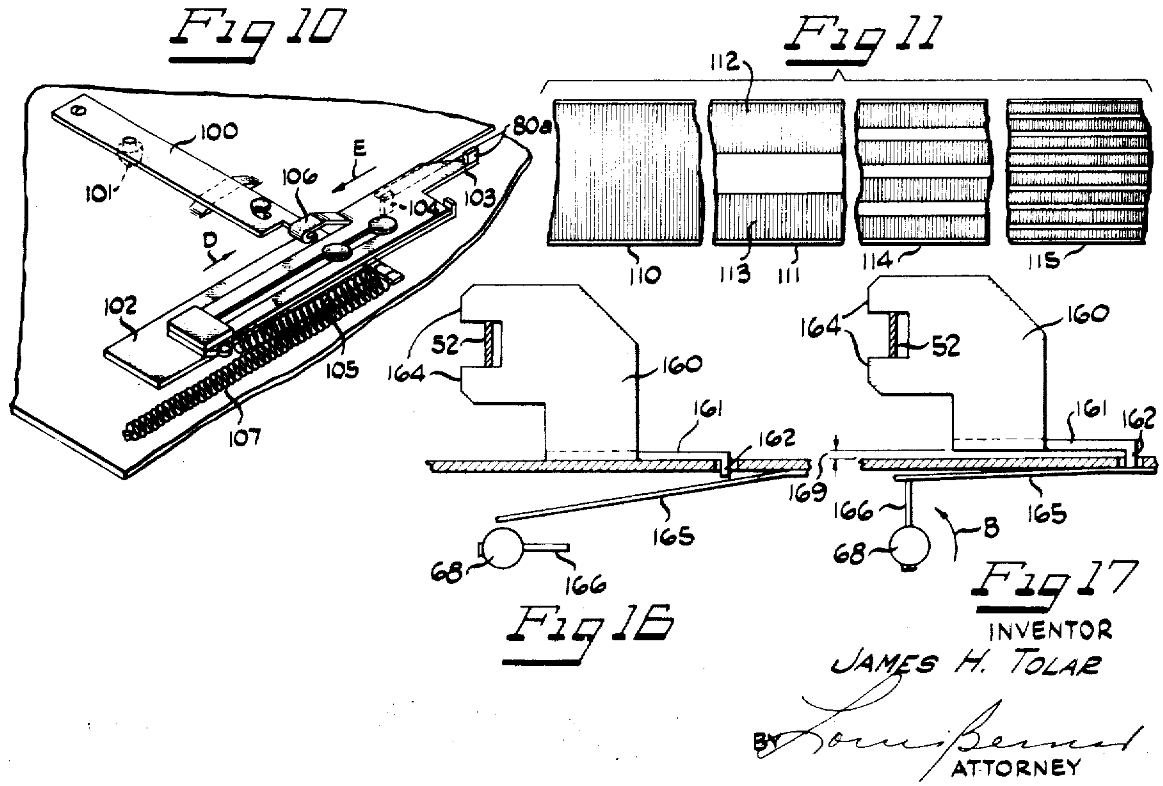
FIG. 10 shows an alternative embodiment of the actuator control.
FIG. 11 shows four exemplary fragments of magnetic tape to illustrate the most common tracking arrangements.
FIGS. 16,17 are two side views showing a subassembly tape guide for switching the position of the magnetic tape relative to a transducer head and according to the type of cartridge which is used.

In accordance with anqther aspect of the invention, the tape position is controlled by means of a tape guide (FIGS. 16, 17) which is operated by the pinch roller actuation control assembly (FIG. 5). In greater detail, this means is best seen in FIGS. 16, 17 as including a bifurcated tape guide plate 160 having a supporting member 161 integral therewith an an actuator pin 162 dependent therefrom.

Conveniently the piece part 160–162 may be made from a single, folded piece of metal. First a suitable plate of metal is stamped out in a desired shape. Then, the tape guide section 160 is folded or bent into a upstanding position at an angle of about 90° with respect to the supporting member 161. At the same time, an opposite end of the plate of metal is bent downward to provide the dependent pin 162. Finally, the entire piece part is mounted, in any convenient manner, to move up and down. For example, it could be mounted somewhat as the arm 138 (FIG. 12) is mounted.

As it passes over the face of the transducer head 143, the tape 52 is raised or lowered by the elevation of the tape guide 160. That is, the tape 52 rides in the jaws 164 at the bifurcation of the tape guide 160. If the guide 160 raises, the tape rides higher on the face of the transducer 143. Conversely, if the guide 160 lowers, the tape rides lower on the face of the transducer.

To position the tape guide, an actuating spring 165 is suitably mounted to undertake vertical (as viewed in FIGS. 16, 17) mechanical excursions responsive to the motion of the pinch roller shaft 68. The dependent pin 162 normally rests in lower position against the spring 165. The pinch roller shaft 68 supports a pusher rod 166 below the actuating spring 165. When the pinch roller is in its nonoperating position, as shown in FIGS. 5, 8 and 16, the pusher rod 166 does not touch the actuating spring 165 which hangs downwardly under spring tension. When the pinch roller is flipped upwardly into its operating position, as shown in FIGS. 9, 17, the pusher rod 166 pushes the actuating spring 165 upwardly. Thus, spring 165 engages the dependent pin 162 and pushes the tape guide 160 to the raised position. If the tape is positioned according to the foregoing assumptions, the tape guide 160 raises 0.016 inches, here shown as the distance 169.

These drawings have shown only three transducer and two tape positions. However, it should be understood that any suitable number of other positions might also be shown. Likewise, other modifications may be made without departing from the spirit of the invention.

I claim:

1. A universal tape player comprising means for receiving any one of a plurality of magnetic tape cartridges containing a tape adapted to be driven by a capstan cooperating with means for pressing the tape against said capstan, said cartridges being either of a first-type containing said means for pressing or of a second-type wherein said means for pressing is external of said cartridge, a capstan positioned adjacent the cartridge receiving means selectively operable means for pressing the tape against said capstan, sensing means associated with said cartridge receiving means for exploring said cartridge to ascertain which of said types is present, and selectable drive means operated responsive to the sensing of said second type for driving said selectively operable pressing means into operative relationship with said capstan.

2. The tape player of claim 1 wherein said first-type cartridge includes a cartridge floor without an opening therein and said second-type cartridge includes a cartridge floor having an opening therein; said selectively operable pressing means comprising a toggle mounted pinch roller positioned outside said cartridge and adjacent the opening location in said floor, and said selectable drive means comprises means for selectively flipping said pinch roller through said opening and into said cartridge responsive to a detection of said opening by said sensing means.

3. The tape player of claim 1 wherein said first-type cartridge includes a cartridge floor without an opening therein and said second-type cartridge includes a cartridge floor having an opening therein; said selectively operable pressing means comprising a toggle-mounted pinch roller positioned outside said cartridge and adjacent the opening location in said floor, and means cooperating with said selectable drive means for selectively precluding the flipping of said pinch roller responsive to a detection of no opening in said floor by said sensing means.

4. The tape player of claim 1 and transducer means, means responsive to the sensing of said second-type cartridge for selectively positioning said tape at a predetermined one of two locations relative to said transducer, the other of said locations corresponding to a playback location for said first-type cartridge.

5. The tape player of claim 1 including a transducer and means for selectively positioning said transducer opposite a predetermined track on said tape.

6. The tape player of claim 5 wherein said selectable drive means comprises a toggle-mounted pinch roller positioned adjacent said capstan, means for selectively flipping said pinch roller into said cartridge responsive to said sensing means, said means for positioning said transducer comprising a rotary mounted index wheel having an upper horizontally indexed cam surface thereon, means responsive to the rotary position of said upper cam surface for indicating the position of said transducer, a lower vertically indexed cam surface on said index wheel, means riding on said lower cam for selectively raising and lowering said transducer responsive to the rotary position of said lower cam surface, a ratchet wheel on said index wheel for selecting said rotary position of said upper and lower cam surfaces, and solenoid controlled means operating against said ratchet wheel for rotating said indexing wheel in a step-by-step manner.

7. The tape player of claim 6 and tape guide means comprising a spring-loaded bifurcated plate with a magnetic tape riding between the jaws of said bifurcation, and means associated with said pinch roller for changing the position of said plate responsive to the flipping of said pinch roller.

8. Apparatus for playing tape cartridges of both the type having a self-contained pressure roller and the type without a self-contained pressure roller comprising, a selectively expellable tape player pressure roller, a tape player driving capstan, means for sensing the presence or absence of a self-contained pressure roller in a cartridge being inserted, means responsive to the sensing of the absence of a self-contained pressure roller for expelling said tape player pressure roller to then urge said tape player pressure roller through an opening in said cartridge in playing position urging the tape in said cartridge against said tape player driving capstan, said means for expelling comprising, pressure roller actuating lever means for engagement with the front of a tape cartridge and comprising means for coupling movement of a then engaged tape cartridge into expelling said tape player pressure roller, and said means for sensing comprises detent responsive to the presence or absence of an opening in a cartridge then being inserted substantially at the time when the latter cartridge front first engages said pressure roller actuating lever means.

9. Apparatus for playing tape cartridges in accordance with claim 8 wherein said means for coupling movement further comprises, slide means for actuating the expulsion of said tape player pressure roller, coupling means for selectively establishing engagement of said pressure roller actuating lever means with said slide means, and means for linking said detent with the latter coupling means so that actuation of said detent by the bottom of a cartridge when said front first engages said pressure roller actuating lever means disengages the latter lever means and said slide means to prevent said slide means from actuating expulsion of said tape player pressure roller when a cartridge having a self-contained pressure roller is inserted while allowing said slide means to actuate expulsion of said tape player pressure roller when a cartridge without a self-contained pressure roller is inserted.

* * * * *